(12) United States Patent
Takahashi et al.

(10) Patent No.: US 9,434,260 B2
(45) Date of Patent: Sep. 6, 2016

(54) CHARGING CABLE SUPPORT ARM

(71) Applicants: Kawamura Electric, Inc., Seto-Shi (JP); Honda Motor Co., Ltd., Tokyo (JP)

(72) Inventors: Norio Takahashi, Seto (JP); Michihito Ohkado, Wako (JP); Makoto Ogawa, Wako (JP); Katsutoshi Matsushita, Wako (JP)

(73) Assignees: Kawamura Electric, Inc., Seto-Shi (JP); Honda Motor Co., Ltd., Minato-Ku (JP)

( * ) Notice: Subject to any disclaimer, the term of this patent is extended or adjusted under 35 U.S.C. 154(b) by 55 days.

(21) Appl. No.: 14/315,911

(22) Filed: Jun. 26, 2014

(65) Prior Publication Data

US 2015/0060611 A1 Mar. 5, 2015

(30) Foreign Application Priority Data

Aug. 28, 2013 (JP) .................. 2013-176973

(51) Int. Cl.
| | | |
|---|---|---|
| *F16L 3/00* | (2006.01) | |
| *B60L 11/00* | (2006.01) | |
| *F16M 7/00* | (2006.01) | |
| *B60L 11/18* | (2006.01) | |

(52) U.S. Cl.
CPC ............ *B60L 11/00* (2013.01); *B60L 11/1816* (2013.01); *B60L 2230/12* (2013.01); *F16M 7/00* (2013.01); *Y02T 10/7005* (2013.01)

(58) Field of Classification Search
CPC .......... F16M 11/04; F16M 3/01; F16M 7/00; A47B 19/00; B60L 11/00; B60L 11/1816; B60L 2230/12; Y02T 10/7005
USPC ....... 248/274.1, 278.1, 282.1, 288.11, 206.5, 248/289.11, 70, 125.7; 292/251; D14/452
See application file for complete search history.

(56) References Cited

U.S. PATENT DOCUMENTS

| | | | | |
|---|---|---|---|---|
| 1,733,107 A | * | 10/1929 | Ahlberg | ................. A47B 19/00 248/278.1 |
| 4,895,333 A | * | 1/1990 | Antinora | ................ A47H 19/00 248/289.11 |
| 5,560,583 A | * | 10/1996 | Holmgren | ............. B08B 15/002 248/289.11 |
| 6,409,134 B1 | * | 6/2002 | Oddsen, Jr. | ............ F16M 11/04 248/274.1 |
| D505,858 S | * | 6/2005 | O'Keene | ........................ D8/355 |
| 8,469,049 B2 | * | 6/2013 | Garceau | ................. B60R 15/04 137/355.12 |

(Continued)

FOREIGN PATENT DOCUMENTS

| | | |
|---|---|---|
| JP | 2006-136182 A1 | 5/2006 |
| JP | 2012-019633 A1 | 1/2012 |

*Primary Examiner* — Tan Le
(74) *Attorney, Agent, or Firm* — Burr & Brown, PLLC

(57) ABSTRACT

A charging cable support arm includes a support member that is fixed to a wall face, a first arm whose proximal end portion is hinged to the support member and that is rotatable within a horizontal plane, and a second arm that is hinged to a distal end of the first arm and that is rotatable within a horizontal plane. The first arm is provided with a first passage hole through which a charging cable is inserted into the first arm, and the second arm 3 is provided with, at a distal end thereof, a fourth passage hole from which the inserted charging cable is pulled out, and by use of the charging cable pulled out of the fourth passage hole, an electric vehicle is charged.

7 Claims, 7 Drawing Sheets

(56) References Cited

U.S. PATENT DOCUMENTS

| | | | | |
|---|---|---|---|---|
| 2004/0120134 A1* | 6/2004 | Nguyen | ............... | H02B 1/202 361/825 |
| 2009/0212184 A1* | 8/2009 | Bourgeois | ............ | F16M 11/04 248/288.11 |
| 2010/0208418 A1* | 8/2010 | Russell | ............... | F16M 11/04 361/679.01 |
| 2011/0285148 A1* | 11/2011 | Tang | ..................... | E05C 17/32 292/251.5 |
| 2012/0080891 A1* | 4/2012 | Bravo | ................ | E05C 17/443 292/251.5 |
| 2015/0060611 A1* | 3/2015 | Takahashi | ............ | B60L 11/00 248/70 |

* cited by examiner

CHARGING CABLE SUPPORT ARM

BACKGROUND OF THE INVENTION

This application claims the benefit of Japanese Patent Application Number 2013-176973 filed on Aug. 28, 2013, the entirety of which is incorporated by reference.

1. Field of the Invention

The present invention relates to a charging cable support aim which supports a charging cable for charging an electric vehicle.

2. Description of Related Art

For charging an electric vehicle, it has been common that the vehicle is parked in parking space such as a parking area, a charging cable connected to a dedicated charging device installed beside the parking space is drawn around, and a charging connector provided at the distal end of the charging cable is connected to a charging port of the electric vehicle (for example, see Japanese Patent Application Publication No. 2012-19633).

In this case, by extending the length of the charging cable, the charging cable can be easily connected to the electric vehicle, and the electric vehicle is charged without taking into consideration of how the electric vehicle is parked or the position of the charging port.

However, in the above case, if the charging port of the electric vehicle is away from the charging device, the charging cable is drawn around on the ground. This causes abrasion of the charging cable leading to deterioration thereof, and causes the charging cable to be dirty with mud or the like, which makes it difficult to handle the charging cable.

Therefore, as shown in Japanese Patent Application Publication No. 2006-136182, for example, it has been considered that suspension fittings are provided on a ceiling to suspend the charging cable at mid-portions thereof, so that charging operation is performed by pulling out the charging cable without bringing it into contact with the ground.

SUMMARY OF THE INVENTION

However, using the suspension fittings as in Japanese Patent Application Publication No. 2006-136182 above poses the following disadvantages. First, parking areas provided with a ceiling are limited in number. Moreover, even when such suspension fittings can be provided, the area where the charging cable is movable is limited to the area below the provided suspension fittings, and thus, the charging cable using such suspension fittings cannot be used for some types of vehicles in which the position of the charging port of the electric vehicle is different. Moreover, even with the same vehicle, if it is parked in an opposite direction, the charging port is positioned at a completely different position, which also prevents smooth charging operation.

Therefore, in view of the above disadvantages, an object of the present invention is to provide a charging cable support arm which supports the charging cable such that even in a parking area without a ceiling, the charging cable can be connected to the charging port of the electric vehicle at any position without bringing the charging cable into contact with the ground.

In order to solve the above disadvantages, a first aspect of the invention is a charging cable support arm including a support member that is configured to be fixed to a wall face or a support post, a first arm whose proximal end portion is hinged to the support member and that is rotatable within a horizontal plane, and a second arm that is hinged to a distal end of the first arm and that is rotatable within a horizontal plane. The first arm is provided with an insertion hole through which a charging cable is inserted into the first arm. The second arm is provided with a pull-out hole at a distal end thereof or near the distal end, and the inserted charging cable is pulled out from the pull-out hole. By use of the charging cable pulled out of the pull-out hole, an electric vehicle is charged.

According to this configuration, the support member is fixed to a position higher than the electric vehicle, and charging is performed by use of the charging cable which is supported by the arms foldable in two stages and pulled out of the pull-out hole of the second arm. Thus, even in a parking area without a ceiling, the charging cable can be moved in a preferable manner. Accordingly, the electric vehicle can be charged without bringing a mid-portion of the charging cable into contact with the ground, and thus, dragging the charging cable to cause deterioration thereof, making the charging cable dirty with mud, or the like is eliminated.

A second aspect of the invention is a charging cable support arm in the configuration according to the first aspect, in which the second arm is hinged to the first arm so as to rotate to an angle at which the second arm becomes parallel to and faces the first arm. Either one of the first arm and the second arm is provided with a magnet for attracting and holding the other counterpart facing thereto.

According to this configuration, the second arm folded to face the first arm is maintained by the magnet.

A third aspect of the invention is a charging cable support arm in the configuration according to the first or second aspect, in which the support member is fixed to the wall face, the first arm is hinged rotatably in one specific direction to an angle at which the first arm becomes parallel to the wall face to which the support member is fixed, and the support member has an engagement portion which engages a side portion of the first arm when the first arm is rotated and arranged in parallel to the wall face. The engagement portion or the side portion of the first arm facing the engagement portion is provided with a magnet for attracting and holding the engaged counterpart.

According to this configuration, the state where the first arm is parallel to the wall face is maintained by the magnet. Thus, while the charging cable support arm is not used, the charging cable support arm can be held in close contact with the wall face.

A fourth aspect of the invention is a charging cable support arm in the configuration according to the third aspect, in which the first arm and the second arm each have a substantially identical length, and the first arm and the second arm are each hinged so as to be rotatable by substantially 180 degrees.

According to this configuration, the first arm can be rotated about the installation portion of the wall face serving as the center, to be arranged in parallel to the wall face either on the left or right side. The distal end of the second arm can be moved along the arc of a substantially semicircular shape having a radius of a length obtained by adding the length of the first arm and the length of the second arm together. Further, the second arm can be moved along the arc of a substantially semicircular shape having a radius of the length of the second arm about the distal end of the first arm serving as the center. Therefore, the charging cable pull-out hole can be moved in a wide range, the area where the charging cable is suspended is wide, and, for any position of the charging port of an electric vehicle, charging can be performed without bringing the charging cable into contact with the ground.

According to the present invention, the support member is fixed to a position higher than the electric vehicle, and charging can be performed by use of the charging cable supported by the arms foldable in two stages. Therefore, the electric vehicle can be charged without bringing a mid-portion of the charging cable into contact with the ground, and dragging the charging cable to cause deterioration thereof, making the charging cable dirty with mud, or the like is eliminated.

BRIEF DESCRIPTION OF THE DRAWINGS

FIGS. 1A and 1B each show a perspective view of one example of a charging cable support arm according to the present invention, of which FIG. 1A shows a state where the charging cable support arm is extended and FIG. 1B shows a state where the charging cable support arm is folded.

FIGS. 2A and 2B each show a right side perspective view of a state where the charging cable support arm is extended, of which FIG. 2A shows the entirety of the charging cable support arm and the FIG. 2B shows an enlarged view of an A portion in FIG. 2A.

FIGS. 3A to 3C each show a state where the charging cable support arm is installed to a wall face and is folded, of which FIG. 3A is a bottom view, FIG. 3B is a left side view, and FIG. 3C is a right side view.

FIGS. 7A and 7B each show the state in FIG. 6 viewed from other angles, of which FIG. 7A is a front view when facing the wall, and FIG. 7B is viewed from the left side in the front view when facing the wall.

DETAILED DESCRIPTION OF THE INVENTION

Figure 1A:
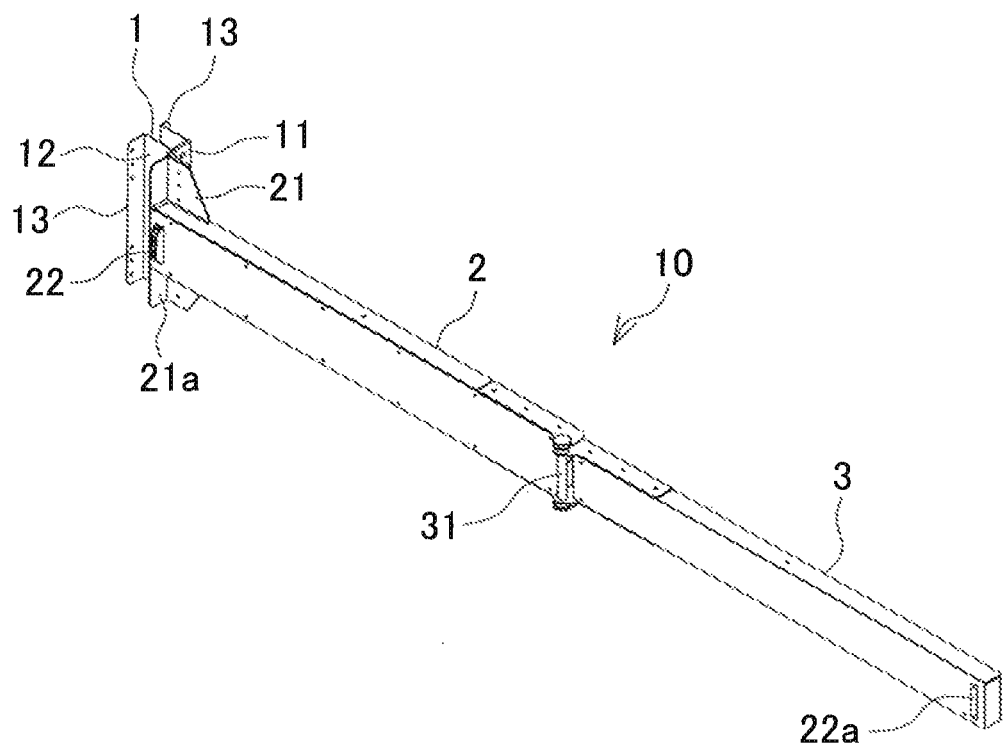
Figure 1B:
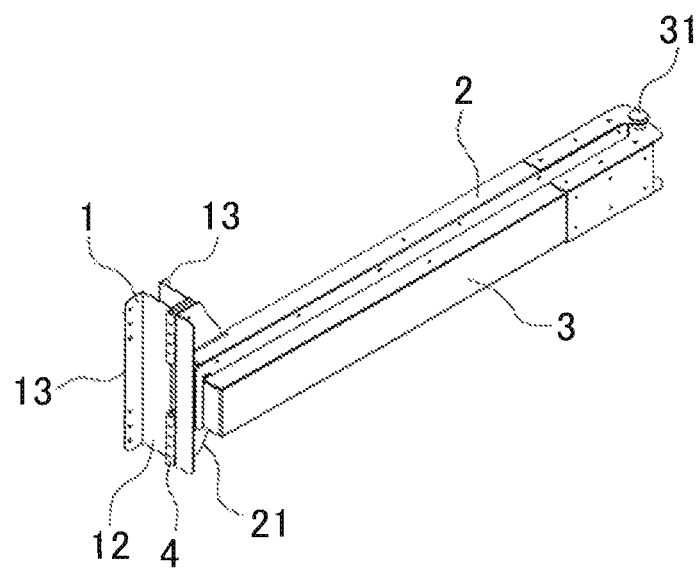
Figure 2A:
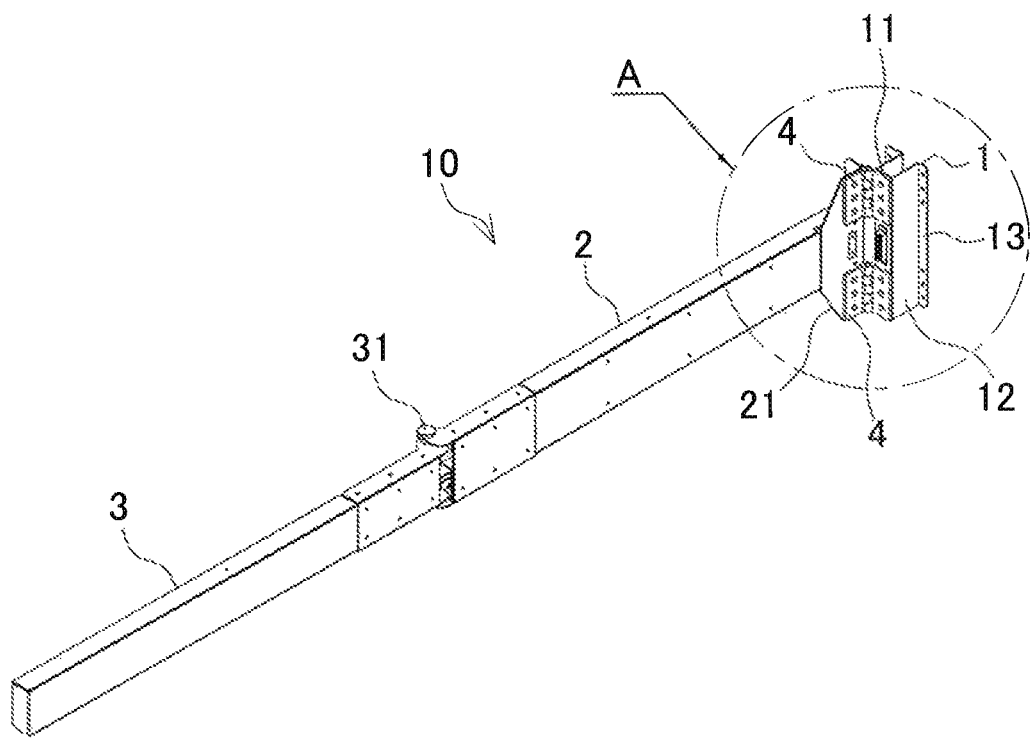
Figure 2B:
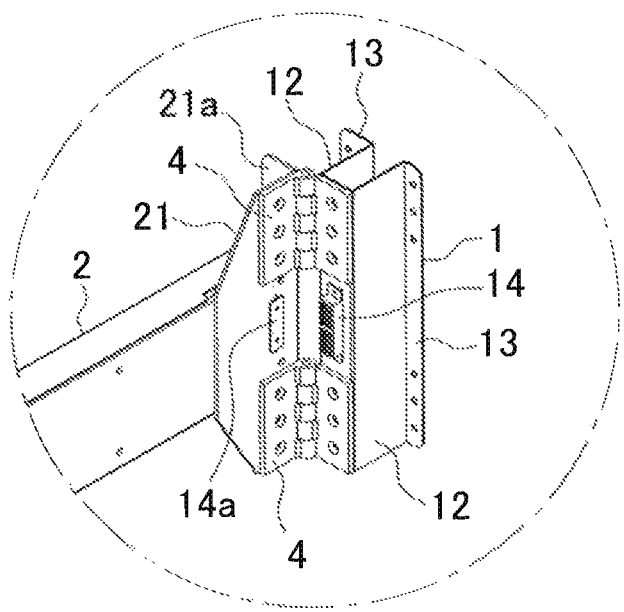

Hereinafter, an embodiment implementing the present invention will be described in detail with reference to the drawings. FIGS. 1A and 1B are perspective views showing one example of a charging cable support arm according to the present invention. FIG. 1A is a left side perspective view showing a state where an arm is extended, and FIG. 1B is a left side perspective view showing a state where the arm is folded. FIGS. 2A and 2B are also perspective views showing one example of a charging cable support arm according to the present invention. FIG. 2A is a right side perspective view showing a state where the arm is extended, and FIG. 2B is an enlarged view of an A portion in FIG. 2A.

A charging cable support arm 10 includes a support member 1 to be fixed to a wall face, a first arm 2 whose proximal end portion is hinged to the support member I, and a second arm 3 hinged to the distal end of the first arm 2. Each of the support member, the first arm 2, and the second arm 3 is formed by bending a steel plate.

The support member 1 has an arm support face 11 substantially at its center. A hinge 4 is mounted on the arm support face 11 to hinge the first arm 2 thereto. In the support member 1, the aim support face 11 is arranged so as to protrude, with left and right portions of the arm support face 11 being bent rearward, and side plates 12 formed by being bent are respectively provided with fixing faces 13 at rear portions thereof. The fixing faces 13 extend in the left and right directions so as to be fixed to the wall face.

The first arm 2 is a tubular body having a quadrangle shape in its cross section. A reinforcement plate 21 is mounted to the first arm 2 so as to mount the hinge to a proximal end portion of the first arm 2 that is one end serving as the center of rotation. The reinforcement plate 21 is welded to the right face of the first arm 2, and is bent in an L-shape to form a rear plate 21a of the first arm 2.

The support member 1 and the reinforcement plate 21 each have a width sufficiently larger than the width (the width in the up-down direction) of the first arm 2. The first arm 2 is rigidly hinged by use of two hinges 4 so as to be rotatable in a semicircular shape within a horizontal plane, from a state where the hinges 4 are closed to a state where the hinges 4 are open by 180 degrees.

When the hinges 4 are open by 180 degrees to arrange the first arm 2 in parallel to the wall face, the rear plate 21a abuts against the side plate 12 of the support member 1, whereby further rotation of the first arm 2 is prevented and contact thereof with the wall face is prevented.

As shown in the enlarged view of FIG. 2B, a magnet (first magnet) 14 is mounted to the center of the arm support face of the support member 1. Accordingly, when the first arm 2 is rotated in a direction to close the hinges 4 and becomes parallel to the wall face, the first arm is brought into close contact with the magnet, whereby the closed state is maintained.

To the right face of the first arm 2 corresponding to the first magnet 14A, a contact piece 14a for reinforcing a portion that comes into close contact with the first magnet 14 and for ensuring the close contact is mounted.

On the other hand, a magnet (second magnet) 22 is mounted to a proximal end portion of the left face of the first arm 2. Accordingly, the second arm 3 folded as shown in FIG. 1B is brought into close contact with the second magnet 22, whereby the folded state is maintained. To a side of a distal end portion of the second arm 3, a contact piece 22a for reinforcing a portion corresponding to the second magnet 22 and for ensuring the close contact is mounted.

Similarly to the first aim 2, the second arm 3 is a tubular body having a quadrangle shape in its cross section, and is hinged to be coupled to the distal end of the first arm 2 via a hinge shaft 31, so as to rotate on the same plane as the plane on which the first arm 2 rotates. Specifically, the second arm 3 is hinged to the first arm 2 so as to be rotatable substantially by 180 degrees, from a state where the second arm 3 is straightly aligned with the first arm 2 to a state where the second arm 3 rotates leftward to be parallel to and face the first arm 2 as shown in FIG. 1B.

Figure 3A:
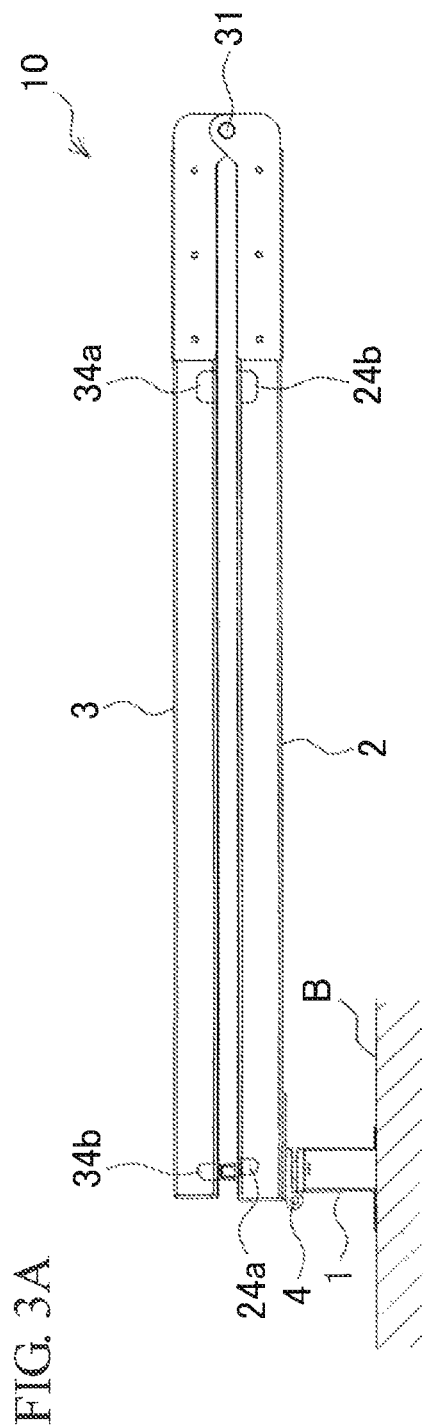
Figure 3B:
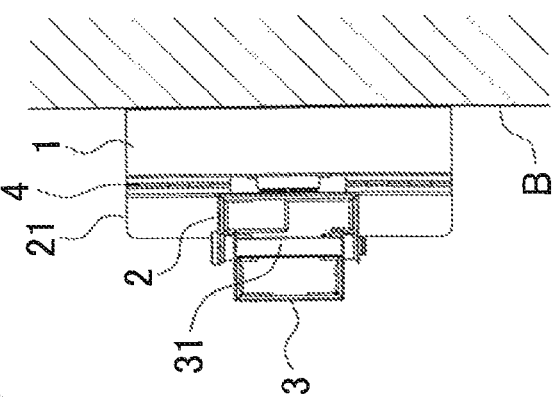
Figure 3C:
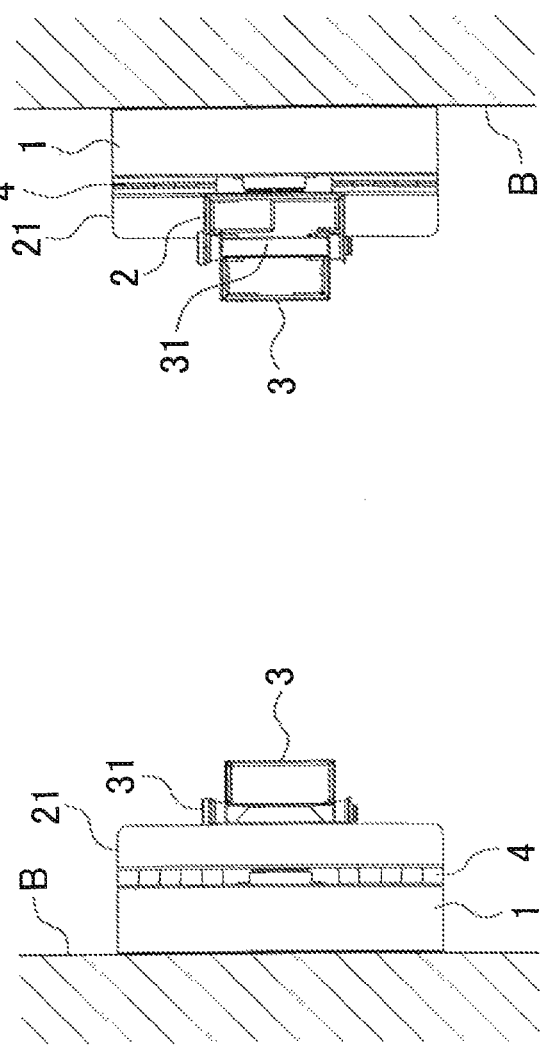

FIGS. 3A to 3C show a state where the charging cable support arm 10 is installed to the wall face and folded. FIG. 3A is a bottom view, FIG. 3B is a left side view, and FIG. 3C is a right side view. As shown in FIG. 3A, the bottom faces of the first arm 2 and the second arm 3 are provided with passage holes (first passage hole 24a, second passage hole 24b, third passage hole 34a, and fourth passage hole 34b) for having a charging cable passed therethrough and supporting it.

The charging cable is inserted in the first arm 2 between the first passage hole 24a formed near the proximal end portion of the first arm 2 and the second passage hole 24b formed at the distal end portion thereof, and inserted in the second arm 3 between the third passage hole 34a formed near the proximal end portion of the second arm 3 and the fourth passage hole 34b formed at the distal end portion thereof, whereby mid-portions of the charging cable are supported.

Figure 4:
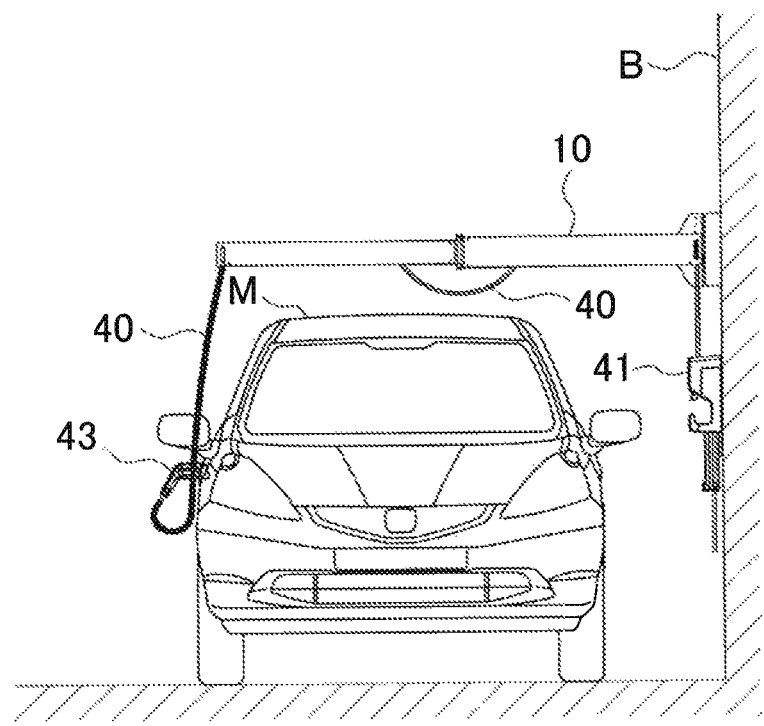
FIG. 4 shows the charging cable support arm with a charging cable passed therethrough, and shows how an electric vehicle is charged.

FIG. 4 shows how an electric vehicle M is charged with the charging cable passed through the charging cable support arm 10. In FIG. 4, the reference numeral 40 represents a charging cable, and the reference numeral 41 represents a charging device for supplying charging power. The charging device 41 is installed to a wall face below the charging cable support arm 10.

The charging cable 40 has its proximal end portion connected to the charging device 41, and is passed through the first arm 2 and the second arm 3 via the first passage hole 24a, the second passage hole 24b, the third passage hole 34a, and the fourth passage hole 34b as described above. A charging connector 43 is mounted to the tip of the charging cable 40 pulled out of the distal end of the second arm 3. The charging connector 43 is connected to the charging port of the electric vehicle M, whereby the electric vehicle M is charged. The charging port is provided on the left side shown in FIG. 4, of the electric vehicle M.

The charging cable support arm 10 is mounted to a wall face B at a height of, for example, 180 centimeters which is higher than the height of the electric vehicle M. The length of each of the first arm 2 and the second arm 3 is, for example, 90 centimeters (about 180 centimeters when both of the first arm 2 and the second arm 3 are combined together). By employing these dimensions, even when the charging port is arranged on the side opposite to the wall face B of the electric vehicle M, charging can be performed without the charging cable 40 being drawn around.

Figure 5:
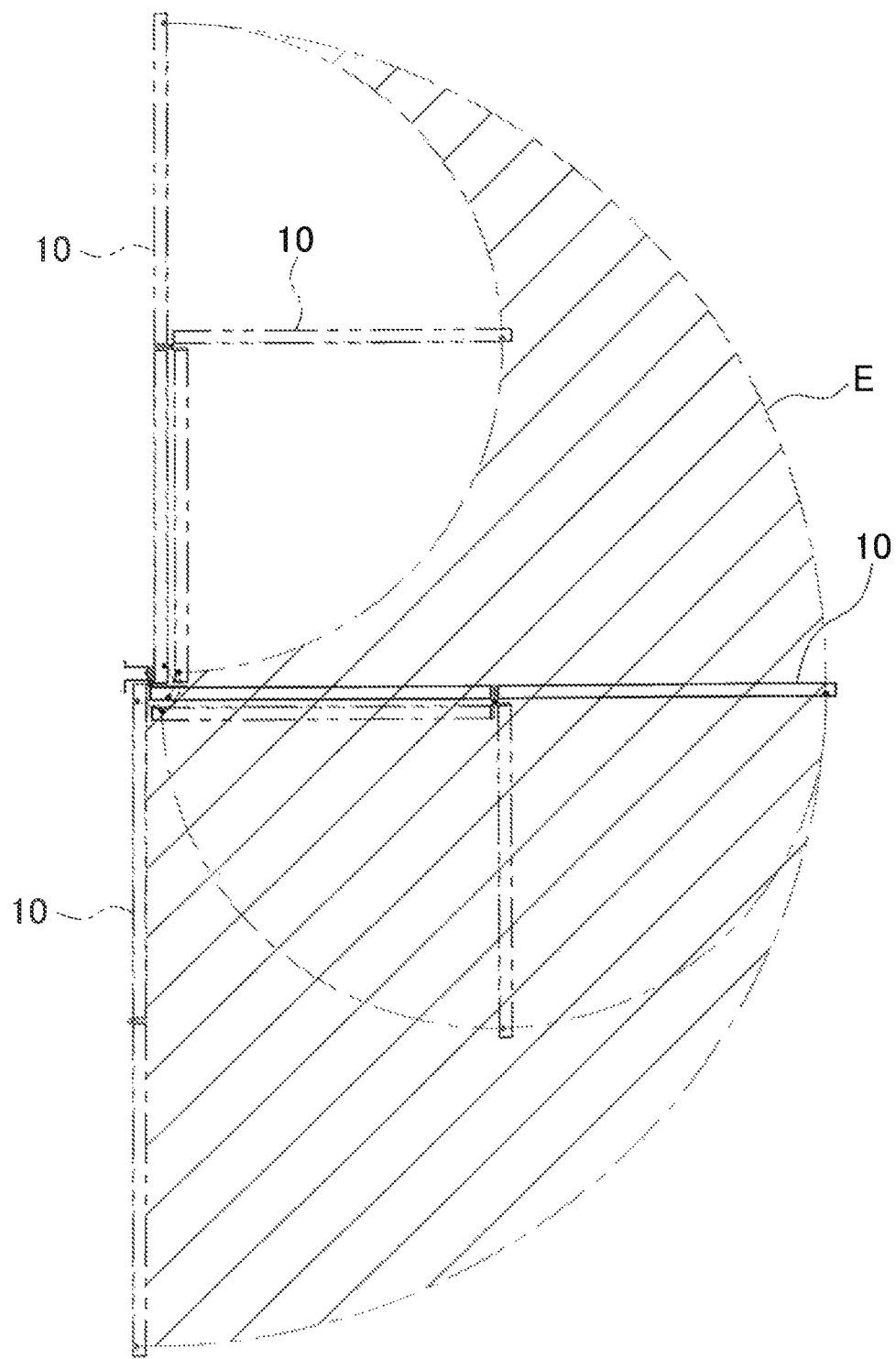
FIG. 5 shows a movable range of the charging cable support arm.

FIG. 5 shows a movable range of the charging cable support arm 10. As shown in FIG. 5, by rotating the first arm 2 and the second arm 3, the distal end of the second arm, i.e., the portion from which the charging connector 43 is suspended, can be moved within a semicircle having a radius of a length obtained by combining the first arm 2 and the second arm 3 together. Specifically, the charging connector 43 can be suspended at any position in an area E with hatching in FIG. 5, to perform charging operation.

Figure 6:
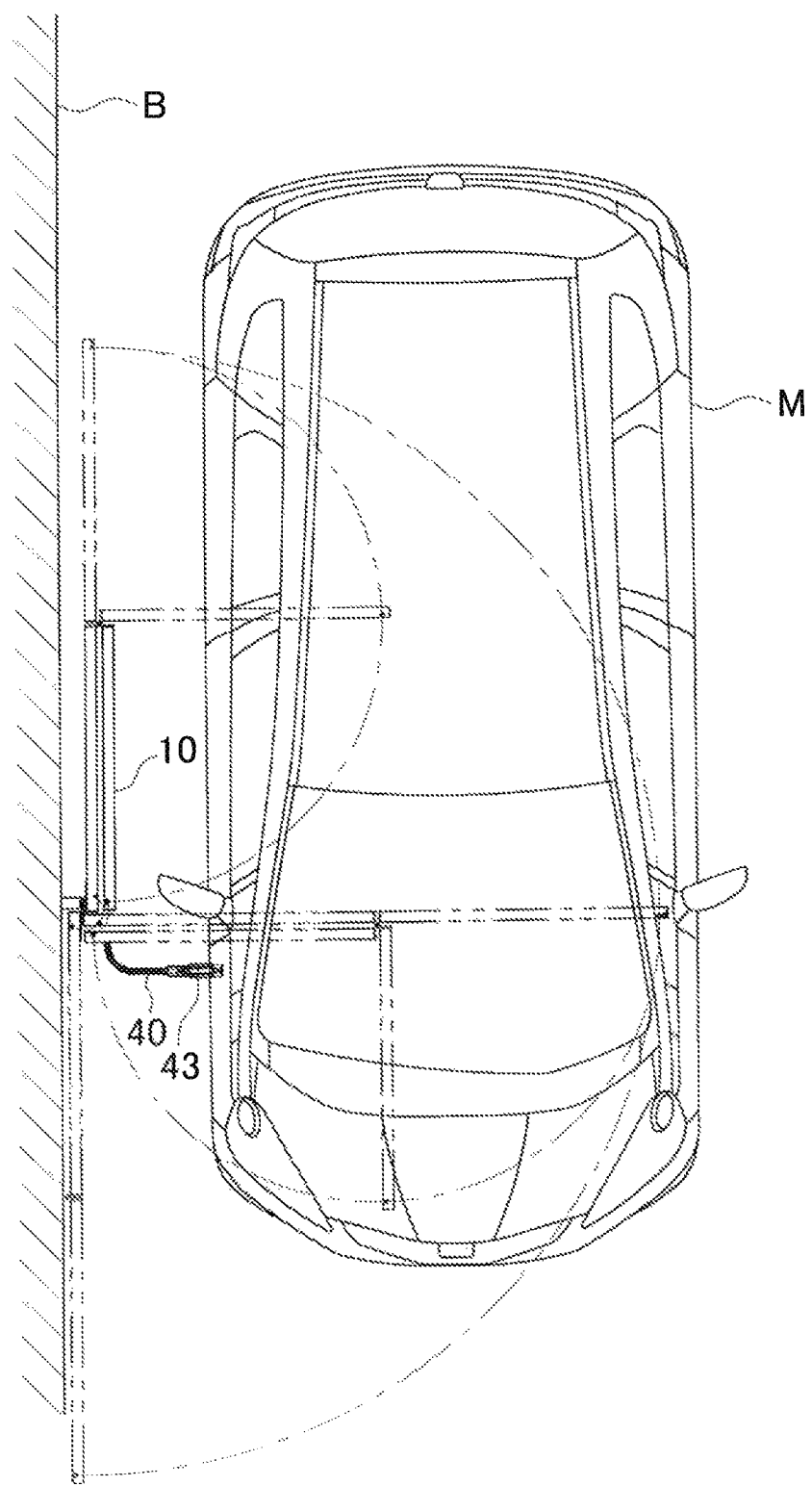
FIG. 6 is a plan view of the charging cable support arm and shows a case where the charging position is changed from that in FIG. 4.
Figure 7A:
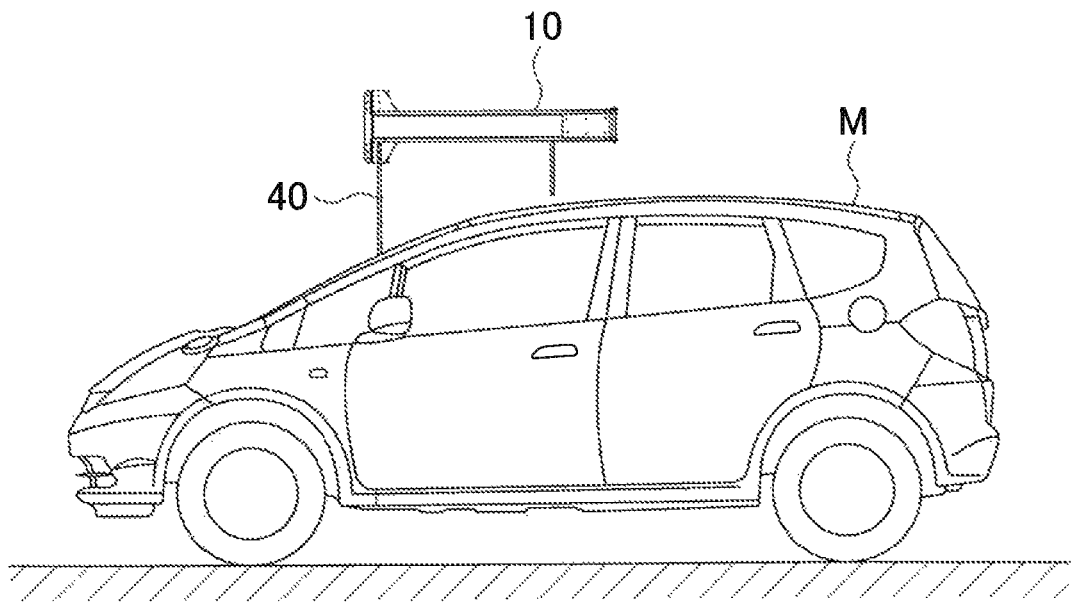
Figure 7B:
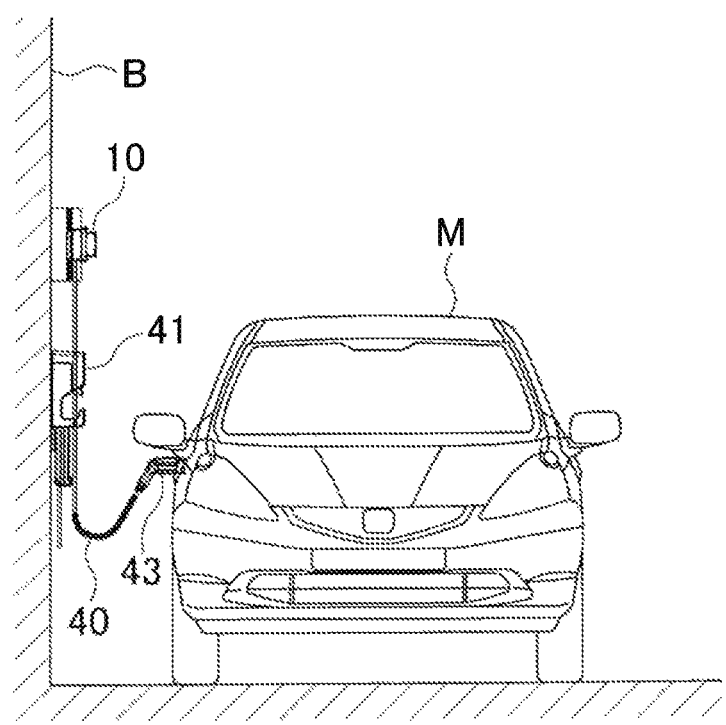

FIG. 6, FIGS. 7A and 7B each show a case where the charging position is changed. FIG. 6 is a plan view of the charging cable support arm 10, FIG. 7A is a front view when facing the wall, and FIG. 7B is viewed from the left side in the front view when facing the wall. As shown in FIG. 6, FIGS. 7A and 7B, in a case where the charging port is near the installation portion of the charging cable support arm 10, that is, near the charging device 41, charging may be performed with the charging cable support arm 10 folded, and the charging can be performed without bringing the charging cable 40 into contact with the ground. Then, as shown in FIG. 4 above, in a case where the charging port is at a position away from the charging device 41, by extending the first arm 2 and the second arm 3 to near and above the charging port, charging can also be performed without bringing the charging cable 40 into contact with the ground.

As described above, the support member 1 is fixed to a position higher than the electric vehicle M, and charging is performed by use of the charging cable 40 supported by the arms 2 and 3 which are foldable in two stages. Thus, even in a parking area without a ceiling, the charging cable 40 can be moved in a preferable manner.

The distal end of the second arm 3 can be moved, about the installation portion of the wall face B serving as the center, along the arc of a substantially semicircular shape having a radius of a length obtained by adding the length of the first arm 2 and the length of the second arm 3 together. Moreover, the distal end of the second arm 3 can be moved, about the distal end of the first arm 2 serving as the center, along the arc of a substantially semicircular shape having a radius of the length of the second arm. Thus, the fourth passage hole 34b that is a charging cable pull-out hole provided at the distal end of the second arm 3 can be moved in a wide range. Accordingly, the area where the charging cable 40 is suspended is wide, and for any position of the charging port of the electric vehicle M, charging can be performed without bringing the charging cable 40 into contact with the ground. Thus, dragging the charging cable 40 to cause deterioration thereof, making the charging cable 40 dirty with mud, or the like is eliminated.

Moreover, the second arm 3 folded to face the first arm 2 is maintained by the second magnet 22. Since the state where the first arm 2 is parallel to the wall face is maintained by the first magnet 14, while the charging cable support arm 10 is not used, the charging cable support arm 10 can be held in close contact with the wall face B.

In the charging cable support arm of the above embodiment, the first arm 2 and the second arm 3 are each formed by bending a steel plate, but existing metal square pipes may be used. Further, in the above embodiment, the charging cable support aim is mounted to a wall face, but a support post may be arranged adjacent to a parking area and the first arm 2 may be rotatably mounted to the support post.

Still further, in the above embodiment, in the course of passing the charging cable 40 from the first arm 2 to the second arm 3, the charging cable 40 is once downwardly exposed to the outside to be slack before being inserted into the second arm 3. However, the charging cable 40 may be directly passed from the first arm 2 to the second arm 3 without being exposed to the outside.

The present invention has been described with respect to charging of the electric vehicle M. However, it is understood that the present invention is preferably used in a plug-in hybrid vehicle provided with a charging function.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A charging cable support arm comprising:
a support member configured to be fixed to a wall face or a support post;
a first arm having a side portion and a proximal end portion having an end face portion, the first arm being hinged to the support member via a connecting hinge, the first arm being rotatable within a horizontal plane;
the support member comprises a first engagement portion that is parallel to and protrudes from the mounting wall face or support post by predetermined distance, and, a second engagement portion that extends perpendicularly from the mounting wall face or support post by the predetermined distance to the first engagement portion to form a corner between the first and second engagement portions, wherein
the connecting hinge is provided at the corner such that the first arm can be rotated in one direction of the horizontal plane until the side portion of the first arm contacts the first engagement portion, and the first arm can be rotated in another direction of the horizontal plane until the end face portion of the first arm contacts the second engagement portion such that the first arm is rotatable by substantially 180 degrees of rotational range in the horizontal plane; and a second arm hinged to a distal end of the first arm, the second arm being rotatable within a horizontal plane, wherein the first arm is provided with an insertion hole through which a charging cable is inserted into the first arm, and the second arm is provided with, at a distal end thereof or near the distal end, a pull-out hole from which the inserted charging cable is pulled out, and by use of the charging cable pulled out of the pull-out hole, an electric vehicle is charged.

2. The charging cable support arm according to claim 1, wherein the second arm is hinged to the first arm so as to rotate to an angle at which the second arm becomes parallel to and faces the first arm, and either one of the first arm and the second arm is provided with a magnet for attracting and holding the other counterpart facing thereto.

3. The charging cable support arm according to claim 1, wherein the support member is fixed to the wall face, the first arm is hinged rotatably in one specific direction to an angle at which the first arm becomes parallel to the wall face to which the support member is fixed, the support member has the first engagement portion which engages the side portion of the first arm when the first arm is rotated and arranged in parallel to the wall face, and the first engagement portion or the side portion of the first arm facing the first engagement portion is provided with a magnet for attracting and holding the engaged counterpart.

4. The charging cable support arm according to claim 2, wherein the support member is fixed to the wall face, the first arm is hinged rotatably in one specific direction to an angle at which the first arm becomes parallel to the wall face to which the support member is fixed, the support member has the first engagement portion which engages the side portion of the first arm when the first arm is rotated and arranged in parallel to the wall face, and the first engagement portion or the side portion of the first arm facing the first engagement portion is provided with a magnet for attracting and holding the engaged counterpart.

5. The charging cable support arm according to claim 3, wherein the first arm and the second arm each have a substantially identical length, and the first arm and the second arm are each hinged so as to be rotatable by substantially 180 degrees.

6. The charging cable support arm according to claim 4, wherein the first arm and the second arm each have a substantially identical length, and the first arm and the second arm are each hinged so as to be rotatable by substantially 180 degrees.

7. The charging cable support arm according to claim 1, wherein the first arm comprises a reinforcement plate having a height and a width that is larger than a height and a width of the first arm, with the reinforcement plate being configured in an L-shape and directly connected to the first arm to form the side portion and the end face portion of the first arm, and the reinforcement plate is hinged via the connecting hinge to the corner of the support member between the first and second engagement portions such that the first arm is rotatable within the horizontal plane.

* * * * *